United States Patent [19]

Nishikawa

[11] Patent Number: 4,790,992
[45] Date of Patent: Dec. 13, 1988

[54] INJECTION MOLDING APPARATUS FOR MAKING FIBER-REINFORCED ARTICLES

[75] Inventor: Kazuo Nishikawa, Hiroshima, Japan

[73] Assignee: Mazda Motor Corporation, Hiroshima, Japan

[21] Appl. No.: 18,025

[22] Filed: Feb. 24, 1987

[30] Foreign Application Priority Data

Apr. 30, 1986 [JP] Japan .............................. 61-66563[U]

[51] Int. Cl.$^4$ ............................................. B29C 45/26
[52] U.S. Cl. ..................................... 425/206; 249/160; 366/96; 366/336; 425/406; 425/542; 425/817 R
[58] Field of Search ............... 425/200, 206, 542, 4 R, 425/817 R, 406, 205, 543, 567, 569; 249/117, 160; 366/96, 341, 336, 340

[56] References Cited

U.S. PATENT DOCUMENTS 4,648,832  3/1987  Reilly et al. ......................... 425/200
4,680,003  7/1987  Schulte et al. ...................... 249/160

FOREIGN PATENT DOCUMENTS 55-133936  10/1980  Japan .

*Primary Examiner*—Willard Hoag
*Attorney, Agent, or Firm*—Burns, Doane, Swecker & Mathis

[57] ABSTRACT

An injection molding apparatus for making a molding of fiber-reinforced synthetic resin which comprises a mold assembly having a molding cavity defined therein, into which a liquid molding material of synthetic resin containing reinforcing fibers is injected. The mold assembly has a gate defined therein, which gate has a thickness within the range of 0.2 to 0.4 times the thickness of a portion of the molding adjacent the gate, and also has a gate land of a length within the range of 10 to 20 times the thickness of the gate.

3 Claims, 3 Drawing Sheets

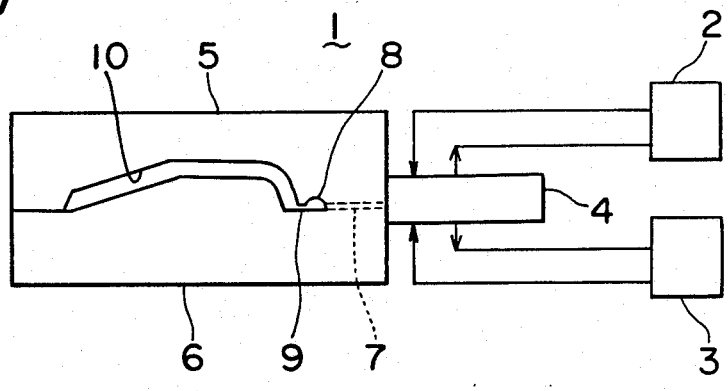
Fig. 1
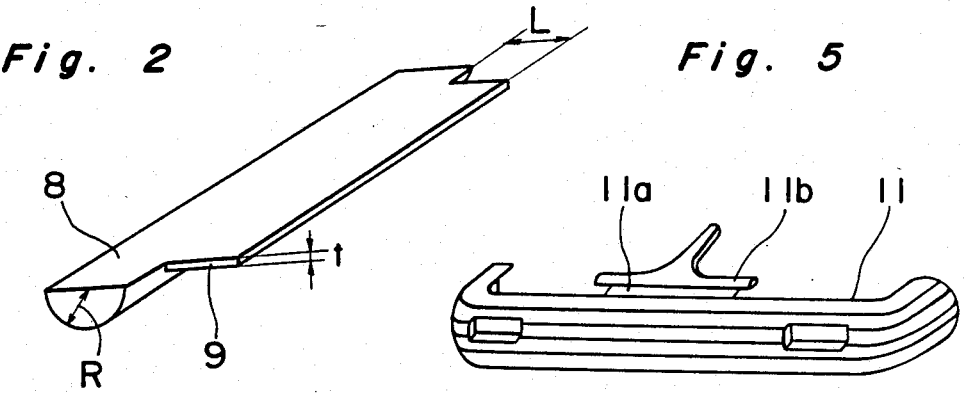
Fig. 2
Fig. 5
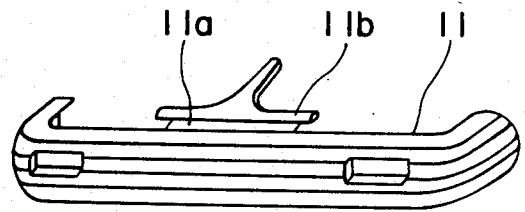
Fig. 3
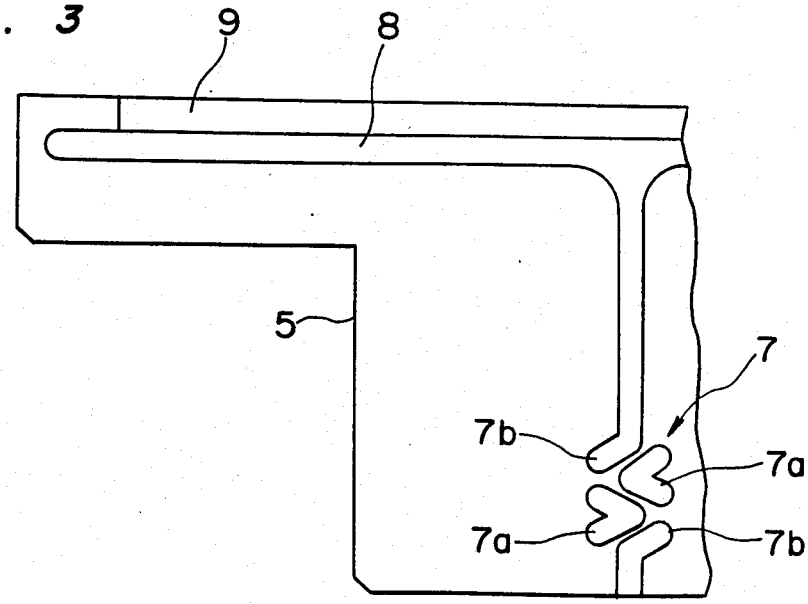

INJECTION MOLDING APPARATUS FOR MAKING FIBER-REINFORCED ARTICLES

BACKGROUND OF THE INVENTION (Field of Technology)

The present invention generally relates to a plastics injection molding technique and, more particularly, to an injection molding apparatus for the manufacture of fiber-reinforced plastics moldings.

Japanese Patent Publication No. 55-133936, published Oct. 18, 1980, discloses a reaction injection molding of fiber-reinforced plastics articles, using a mixture of one of polyurethane, unsaturated polyester, epoxy resin an polyamide with one or more liquid components including, for example, an isocyanate component and an active hydrogen component with the addition of a reinforcing filler such as, for example, glass fibers. By way of example, when by the use of an R-RIM (Reinforced-Reaction Injection Molding) technique polyurethane is injected into a molding cavity through a gate, defined in the mold assembly, in the form as mixed with a first liquid component of polyisocyanate, a second liquid component of polyol and milled glass fibers, a molding of foamed polyurethane reinforced by the milled glass fibers can be obtained and can be used as an automobile bumper. In such case, the milled glass fibers can readily be oriented in a direction conforming to the direction in which the plasticized molding material through the gate, and therefore, although a gate-molded portion of the molded article can exhibit a reduced coefficient of linear expansion in such direction by the presence of the reinforcing fibers, a desirable shrinkage occurs in a direction perpendicular to such direction, that is, in a widthwise direction.

In the prior art injection molding apparatus, it is a general practice to employ the gate having a thickness equal to or greater than 0.5 times the thickness of a portion of the resultant molding adjacent the gate and also to employ a gate land having a length equal to about 4 times the thickness of the gate. While the cross-sectional area of the gate is generally determined in consideration of the speed (2 to 5 m per second) at which the molding material appropriate for use in injection molding is injected, the deflashing can be facilitated by the employment of the gate having a thickness so increased as it will not hamper the deflashing and of the gate land of a length as reduced as possible.

However, it has been found that, with the prior art design of the gate, shrinkage of the gate-molded portion of the resulting molding in the widthwise direction tends to extend to the molded article to such an extent as to result in surface deformation (i.e., undulated surface) of the molded article.

SUMMARY OF THE INVENTION

Accordingly, the present invention has been developed with a view to substantially avoiding the above discussed problem and has for its object to provide an improved injection molding apparatus for making fiber-reinforced plastics moldings effective to avoid the above discussed problem.

In order to accomplish the above object of the present invention, a mold assembly used in the injection molding apparatus embodying the present invention has a gate and a molding cavity both defined therein. The gate has a thickness within the range of 0.2 to 0.4 times the thickness of a portion of the molding adjacent the gate, that is, the thickness of the portion of the resultant molding which is defined adjacent the gate in the mold assembly, and also has a gate land of a length within the range of 10 to 20 times the thickness of the gate.

The injection molding apparatus herein disclosed is so designed that a liquid molding material of synthetic resin containing reinforcing fibers can be injected through the gate into the molding cavity. Since the gate has a reduced thickness as compared with that in the prior art mold assembly and also the gate land has an increased length as compared with that in the prior at mold assembly, the physical strength of the gate-molded portion can be lowered advantageously. Because of the physical strength reduced as hereinabove described, the influence which the shrinkage of the gate-molded portion may bring on the resultant molding can be minimized. This is particularly true where the gate is so designed as to have a gate thickness within the range of 0.2 to 0.4 times the thickness of that portion on the resultant molding and also to have a gate land of a length within the range of 10 to 20 times the thickness of the gate.

If the gate thickness is smaller than 0.2 times the thickness of that portion of the resultant molding, not only does the reduction in physical strength become too excessive, but also the gate width becomes so great as to require a complicating deflashing procedure. On the other hand, if the gate thickness is greater than 0.4 times the thickness of that portion of the resultant molding, the physical strength tends to be increased and, therefore, the resulting molding is susceptible to the surface deformation.

With respect to the gate land, if the land length is greater than 20 times the gate thickness, the surface area of the gate tends to be increased to such an extent as to result in the reduced release property, and also, the rigidity of a joint between the gate-defined portion of the molding and the body of the molding tends to be reduced. On the other hand, if the land length is smaller than 10 times the gate thickness, not only does shrinkage of a runner preceding the gate extends to the molding through the gate, but also the amount of absorption per unit length required to absorb the amount of shrinkage tends to be increased accompanied by the build-up of stresses which would result in the enhanced surface deformation.

According to the present invention, not only can the reduction in physical strength of the gate-molded portion of the molding be accomplished, but also the occurrence of the surface deformation at a portion of the resultant molding adjacent the gate, which would result from the shrinkage of the gate-molded portion of the molding, can advantageously be avoided.

BRIEF DESCRIPTION OF THE DRAWINGS

This and other objects of the present invention will become clear from the following description taken in conjunction with a preferred embodiment thereof with reference to the accompanying drawings, in which:

FIG. 1 is a schematic diagram showing an injection molding apparatus embodying the present invention;

FIG. 2 is a perspective view showing the construction of a runner and a gate;

FIG. 3 is a partial front elevational view, on an enlarged scale, showing a surface of an upper mold;

FIG. 5 is a perspective view showing an example of molded product;

DETAILED DESCRIPTION OF THE EMBODIMENT

Figure 4:
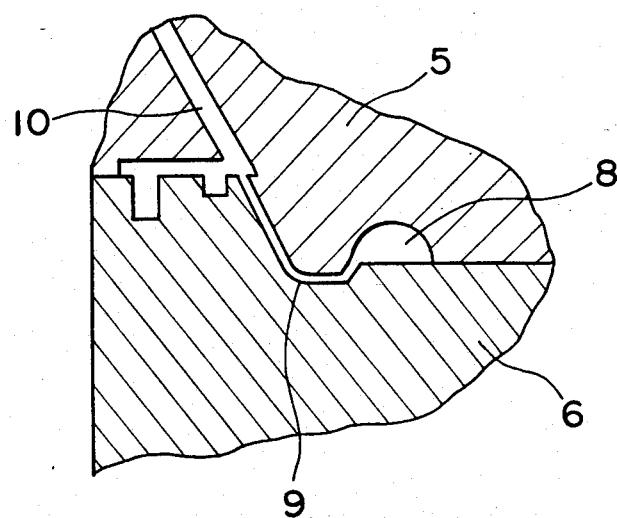
FIG. 4 is a partial longitudinal sectional view showing a portion of the mold assembly adjacent the runner and the molding cavity.

FIG. 1 illustrates a schematic layout of a reaction injection molding apparatus generally indentified by 1. The injection molding apparatus 1 comprises a mixing head 4, a first solution tank 2 containing a quantity of isocyanate and fluid-connected with the mixing head 4 so that an isocyanate solution can be circulated from the tank 2 and back to the tank 2 through the mixing head 4, and a second solution tank 3 containing a quantity of polyol and fluid-connected with the mixing head 4 so that a polyol solution can be circulated from the tank 3 and back to the tank 3 through the mixing head 4. The mixing head 4 is in turn fluid-connected with an after-mixer 7 in a molded assembly comprised of upper and lower dies 5 and 6, it being noted that both of the upper and lower dies 5 and 6 are, during a molding work, heated to a predetermined temperature, for example, 70° C.

In the mold assembly, there is formed a runner 8 and a gate 9 following the after-mixer 7. A mixture of the isocyanate solution and the polyol solution which are supplied from the respective tanks 2 and 3 is, after having mixed in the mixing head 4, further mixed in the after-mixer 7 and is then injected into a molding cavity 10, defined in the mold assembly and between the upper and lower dies 5 and 6, through the runner 8 and the gate 9.

The details of the runner 8 and the gate 9 are best shown in FIG. 2. As shown therein, the runner 8 has a generally semi-circular cross-sectional shape having a radius of curvature of about 20 mm, and the gate 9 has a thickness t within the range of 0.2 to 0.4 times the thickness of a portion of the resultant molded article adjacent the gate and also a gate land of a length L within the range of 10 to 20 times the thickness t.

More specifically, as shown in FIG. 3, the after-mixer 7 is comprised of a series of disconnected grooves 7a and 7b formed in the upper die 5 and a series of similarly disconnected grooves formed in the lower die 6, so that, when the upper and lower dies 5 and 6 are clamped together, the synthetic molding material can flow in a zig-zag fashion through the after-mixer 7 thereby to facilitate uniform mixing of the molding material. The runner 8 is in the form of a groove formed in the upper die 5 so as to intersect in a generally T-shaped fashion with a passage extending from the after-mixer 7.

The gate 9 is defined in respective mating surfaces of the upper and lower dies 5 and 6 so as to extend diagonally upwardly as shown in FIG. 4, and has an extended end opening into the molding cavity 10. The molding cavity 10 is so shaped and so designed as to manufacture a molded article 11 which is, in the instance as shown, a bumper for use in an automobile as shown in FIG. 5, said bumper having a gate-defined portion 11a and a runner-defined portion 11b. The particulars of the gate 9 used to make the automobile bumper so far shown is such that the thickness of a portion of the molded article 11 adjacent the gate 9 is 5 mm, the thickness t of the gate 9 is 1.5 mm, and the length of the gate land is about 25 mm.

Hereinafter, the relationship between the shape of the gate and the deformation of that portion of the molded article adjacent the gate will be discussed, based on the result of a series of experiments.

EXPERIMENT 1

In this experiment, polyurethane was molded by the use of the following R-RIM material.

| (First Solution) | |
| --- | --- |
| Carbodiimide-modified MDI (methylene diisocyanate) | 97 parts by weight |
| Foaming agent (Flon-11) | 3 parts by weight |
| (Second Solution) | |
| Polypropylene glycol (Molecular weight: 5,000) | 90 parts by weight |
| Ethylene glycol | 10 parts by weight |
| Catalyst 1 (Dibutyltin dilaurate) | 0.15 parts by weight |
| Catalyst 2 Triethylene diamine | 1.5 parts by weight |
| Milled glass fibers (Average fiber length: 120μ) | 25 parts by weight |

The particulars of the gate were such that, for 5 mm in thickness of that portion of the molded article adjacent the gate, the gate thickness was 1 mm, the length of the gate land was 15 mm, and the gate width was 600 mm (the cross sectional surface area of the gate being 600 mm$^2$).

Figure 6:
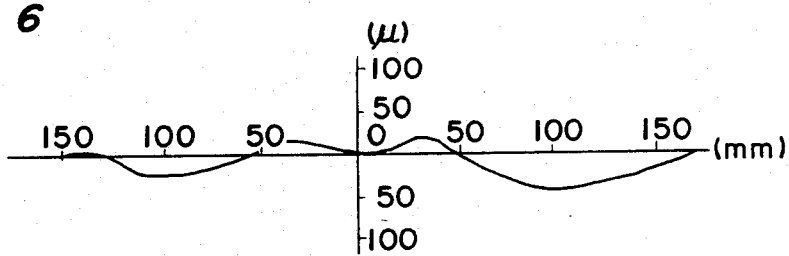
FIG. 6 is a scan line diagram showing a surface deformation occurring in the molded product.
Figure 8:
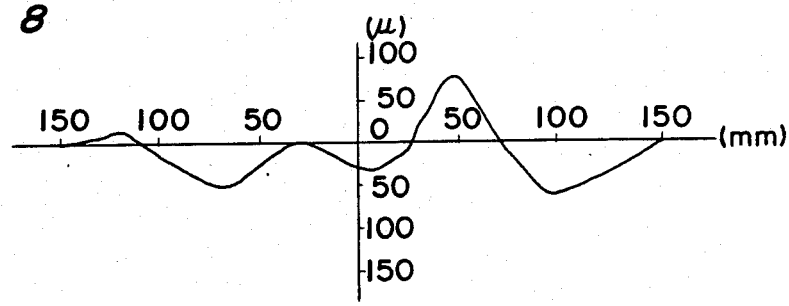
FIGS. 8 and 9 are diagrams similar to FIG. 6, showing the surface deformation occurring in the molded products made for the purpose of comparison and without fibers employed, respectively.

The surface deformation occurring at that portion of the molded article adjacent the gate, which molded article was obtained by carrying out the injection molding under the above described conditions, is such as shown in FIG. 6. As shown therein, the maximum surface deformation was 70μ, and the molded article could be deemed having no surface flaw so far as viewed by sight.

Figure 9:
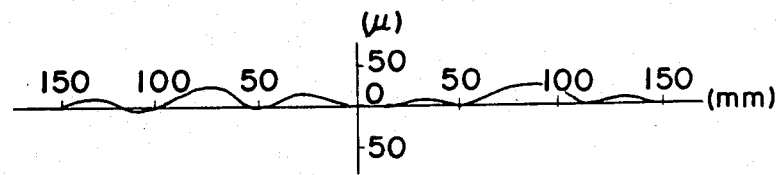
Figure 7:
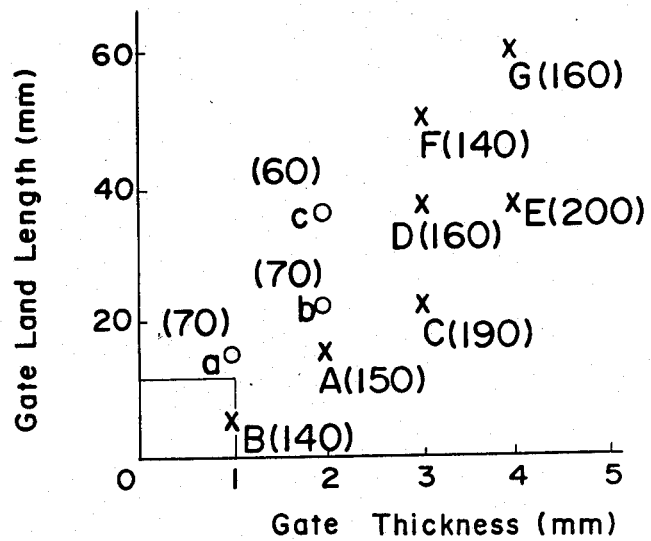
FIG. 7 is a graph showing results of measurement of amounts of surface deformation exhibited by the molded product according to one example of the present invention.

However, when the injection molding was carried out by the use of the R-RIM material of the above described composition while both of the gate thickness and the gate width were varied so as to render the cross-sectional surface area of the gate to be 600 mm$^2$ and also the length of the gate land was varied, and when the maximum amount of surface deformation was subsequently measured of that portion of each of the molded articles, such a result as tabulated in FIG. 7 could be obtained. In FIG. 7, circle markings (o) and cross markings (x) pertain to the examples of the present invention and comparisons, respectively, and each numerical figure in the parentheses represents the maximum amount (μ) of surface deformation. The surface deformation exhibited by the molded article manufactured for the purpose of comparison A is shown in FIG. 7, and the surface deformation exhibited by the molded article manufactured with no glass fiber employed is shown in FIG. 9.

From the result of the above described experiment, it has now become clear clear that, if the gate thickness is chosen to be within the range of 0.2 to 0.4 times the thickness of that portion of the resultant molded article adjacent the gate and the length of the gate land is chosen to be within the range of 10 to 20 times the gate thickness, the surface deformation can be effectively minimized and, therefore, the appearance and the quality of the resultant molded article could be advantageously improved. It is to be noted that, when the surface deformation is greater than $100\mu$, it can be observed by sight and, therefore, it cannot be acceptable. The molded articles made for the purpose of comparison have shown the surface deformation exceeding $100\mu$.

EXPERIMENT 2

In this experiment, a nylon molded article was formed by the use of an injection molding technique with the use of the following R-RIM material.

| (First Solution) | |
|---|---|
| $\epsilon$-caprolactam | 98 parts by weight |
| Natrium caprolactam | 2 parts by weight |
| Milled glass fibers | 25 parts by weight |
| (Average fiber length: $120\mu$) | |
| (Second Solution) | |
| $\epsilon$-caprolactam | 95 parts by weight |
| Bisacyllactam | 5 parts by weight |

Figure 10:
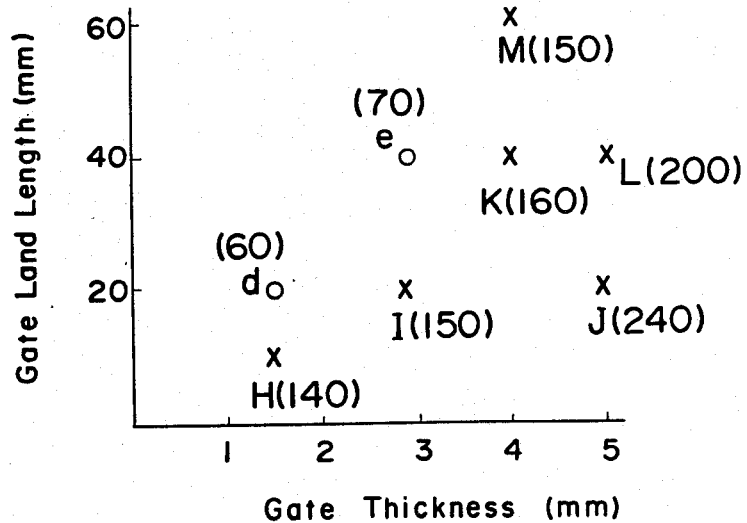
FIG. 10 is a graph similar to FIG. 7, showing the measurement results associated with the molded product according to another example of the present invention.

With respect to the shape of the gate, for 7 mm in thickness of that portion of the resultant molded article adjacent the gate, the gate thickness and the length of the gate land were changed to various respective values. The results of the experiment are shown in FIG. 10 and, as can be understood from FIG. 10, the results similar to those exhibited in the Experiment 1 were obtained.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:

1. An injection molding apparatus for making a molding of fiber-reinforced synthetic resin which comprises:
    a mold assembly having upper and lower dies defining a molding cavity therebetween, into which a liquid molding material of synthetic resin containing reinforcing fibers is injected, said mold assembly having a gate defined therein, which gate has a thickness within the range of 0.2 to 0.4 times the thickness of a portion of the molding adjacent the gate, said gate having a gate land of a length within the range of 10 to 20 times the thickness of the gate; and
    a supply channel for supplying the molding material to said mold assembly, said supply chanel including an after-mixer comprised of first and second series of disconnected grooves formed in said upper and lower dies, respectively, said first and second series of disconnected grooves being cooperable with each other to define a generally zig-zag-shaped passage for the flow of the molding material when the upper and lower dies are fastened together.

2. An injection molding apparatus for making a molding of the fiber-reinforced synthetic resin which comprises:
    a mold assembly including upper and lower dies supported for movement relative to each other, said upper and lower dies being adapted to be selectively clamped together and separated away from each other, said upper and lower dies when clamped together defining a molding cavity within the mold assembly, said mold assembly having defined therein a supply channel for the flow of the molding material into the molding cavity;
    said supply channel including an after-mixer, and a gate extending between the after-mixer and the molding cavity, said gate having a thickness within the range of 0.2 to 0.4 times the thickness of a portion of the molding adjacent the gate, said gate also having a gate land extending in a direction parallel to the direction of flow of the molding material, said gate land having a length within the range of 10 to 20 times the thickness of the gate; and
    said after-mixer being comprised of first and second series of disconnected grooves formed in the upper and lower dies, respectively, said first and second series of disconnected grooves being cooperable with each other to define a generally zig-zag-shaped passage for the flow of the molding material when the upper and lower dies are clamped together.

3. An injection molding apparatus for making a molding of fiber-reinforced synthetic resin which comprises:
    a mixing head for mixing different components together to provide a liquid molding material of synthetic resin containing reinforcing fibers; and
    a mold assembly connected with the mixing head and comprising upper and lower dies supported for movement relative to each other, said upper and lower dies being adapted to be selectively clamped together and separated away from each other, said upper and lower dies when clamped together defining a molding cavity within the mold assemby, said mold assembly having defined therein a supply channel for the flow of the molding material into the molding cavity;
    said supply channel including an after-mixer, fluid-coupled with the mixing head, a runner continued from the after-mixer and a gate extending between the runner and the molding cavity, said gate having a thickness within the range of 0.2 to 0.4 times the thickness of a portion of the molding adjacent the gate, said gate also having a gate land extending from the runner in a direction parallel to the direction of flow of the molding material, said gate land having a length within the range of 10 to 20 times the thickness of the gate; and
    said after-mixer being comprised of first and second series of disconnected grooves formed in the upper and lower dies, respectively, said first and second series of disconnected grooves being cooperable with each other to define a generally zig-zag-shaped passage for the flow of the molding material when the upper and lower dies are clamped together.

* * * * *